United States Patent
Pearson et al.

(10) Patent No.: US 7,440,500 B2
(45) Date of Patent: Oct. 21, 2008

(54) SUPPORTING MOTION VECTORS OUTSIDE PICTURE BOUNDARIES IN MOTION ESTIMATION PROCESS

(75) Inventors: Eric C. Pearson, Conestogo (CA);
Harminder S. Banwait, Waterloo (CA);
Michael D. Gallant, Kitchener (CA)

(73) Assignee: LSI Logic Corporation, Milpitas, CA (US)

( * ) Notice: Subject to any disclaimer, the term of this patent is extended or adjusted under 35 U.S.C. 154(b) by 679 days.

(21) Appl. No.: 10/682,631

(22) Filed: Oct. 9, 2003

(65) Prior Publication Data
US 2005/0013362 A1 Jan. 20, 2005

Related U.S. Application Data
(60) Provisional application No. 60/487,643, filed on Jul. 15, 2003.

(51) Int. Cl.
*H04B 1/66* (2006.01)
*H04N 7/12* (2006.01)
*H04N 11/02* (2006.01)
*H04N 1/04* (2006.01)

(52) U.S. Cl. .................. 375/240.16; 375/240.12; 375/240.13; 375/240.14; 375/240.15

(58) Field of Classification Search ............ 375/240.16, 375/240.12–15
See application file for complete search history.

(56) References Cited

U.S. PATENT DOCUMENTS

| | | | | |
|---|---|---|---|---|
| 5,608,656 A | * | 3/1997 | Purcell et al. ............... | 708/203 |
| 6,108,039 A | * | 8/2000 | Linzer et al. ............ | 375/240.11 |
| 6,421,698 B1 | * | 7/2002 | Hong ......................... | 708/490 |
| 6,813,315 B1 | * | 11/2004 | Auyeung et al. ........ | 375/240.16 |
| 6,868,123 B2 | * | 3/2005 | Bellas et al. ............ | 375/240.16 |
| 2002/0009144 A1 | * | 1/2002 | Ishihara et al. ......... | 375/240.16 |
| 2003/0174252 A1 | * | 9/2003 | Bellas et al. ................ | 348/699 |

OTHER PUBLICATIONS

Sheu-Chich Cheng et al., "A Comparison of Block-Matching Algorithms Mapped to Systolic-Array Implementation", IEEE Transactions on Circuits and Systems for Video Technology, vol. 7, No. 5, Oct. 1997, pp. 741-757.
Eiji Ogura et al., "A 1.2-W Single-Chip MPEG2 MP@ML Video Encoder LSI Including Wide Search Range (H:±288, V:±96) Motion Estimation and 81-MPOS Controller", IEEE Journal of Solid-State Circuits, vol. 33, No. 11, Nov. 1998, pp. 1765-1771.

* cited by examiner

*Primary Examiner*—Marsha D. Banks-Harold
*Assistant Examiner*—Chikaodili E Anyikire
(74) *Attorney, Agent, or Firm*—Christopher P. Maorian P.C.

(57) ABSTRACT

An apparatus generally having a first memory and a circuit is disclosed. The first memory may be used for a motion estimation of a current block. The circuit may be configured to (i) determine if a search window for the current block is at least partially outside a boundary of a picture stored in a second memory, (ii) copy a first plurality of reference samples in the search window from the second memory to the first memory and (iii) map a plurality of reads from the first memory for a plurality of pad samples to the reference samples in the first memory, where the pad samples are determined to be outside the boundary.

16 Claims, 7 Drawing Sheets

SUPPORTING MOTION VECTORS OUTSIDE PICTURE BOUNDARIES IN MOTION ESTIMATION PROCESS

This application claims the benefit of U.S. Provisional Application No. 60/487,643, filed Jul. 15, 2003, which is hereby incorporated by reference in its entirety.

This application is related to co-pending application Ser. No. 10/669,930, filed Sep. 24, 2003 which is hereby incorporated by reference in its entirety.

FIELD OF THE INVENTION

The present invention relates to digital video motion estimation generally and, more particularly, to an apparatus and/or method supporting motion vectors outside the picture boundaries in a motion estimation process.

BACKGROUND OF THE INVENTION

Recent video compression standards allow motion vectors to point to macroblocks that are partially or completely outside picture boundaries for the purpose of motion compensation. Allowing reference macroblocks outside the picture boundaries is useful for tracking the motions of objects at the boundaries, for example moving in or out of the picture. If parts of the reference macroblocks are outside the picture, the pixels do not physically exist. Current motion compensation standards define how the non-existing pixels are to be handled, for example by replicating or mirroring one or more edge reference pixels. For motion estimation, the specific problem is how to generate and search samples (i.e., luminance components of the pixels) that are partially or completely outside picture boundaries.

An existing solution to the missing pixel problem is to ignore outside samples and not search locations that are partially or completely outside the picture boundaries. However, ignoring locations partially or completely outside the picture boundaries can result in decreased compression efficiency. Another existing solution is to generate "pad" samples outside of the motion estimation processor as a separate processing step to form a frame around the picture. The resulting "framed" picture is then stored back into an external memory. The framed picture is subsequently loaded from the external memory to the motion estimation processor for processing. Generating the framed picture, though, increases the external processing, the external memory cycles consumed and the amount of external memory occupied. A third existing solution is to generate the outside samples (pad samples) within the motion estimation processor as a separate processing step and store the resulting "framed" search window back in an internal memory. The framed search region is then accessed from the internal memory of the motion estimation processor. However, generating the frame internally increases the internal processing and increases a size of the internal memory to store the framed picture.

SUMMARY OF THE INVENTION

The present invention concerns an apparatus generally comprising a first memory and a circuit. The first memory may be used for a motion estimation of a current block. The circuit may be configured to (i) determine if a search window for the current block is at least partially outside a boundary of a picture stored in a second memory, (ii) copy a first plurality of reference samples in the search window from the second memory to the first memory and (iii) map a plurality of reads from the first memory for a plurality of pad samples to the reference samples in the first memory, where the pad samples are determined to be outside the boundary.

The objects, features and advantages of the present invention include providing an apparatus and/or method for supporting a motion estimation of a current block beyond a boundary of a picture that may (i) reduce a size of an external memory, (ii) reduce a size on an internal search memory, (iii) operate without extra processing cycles to generate a frame around a reference picture, (iv) may allow for an unlimited sampling distance outside of the boundary, (v) reduce memory bandwidth as "framed" samples may not be fetched from the external memory and/or (vi) map frame information to existing reference picture information.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
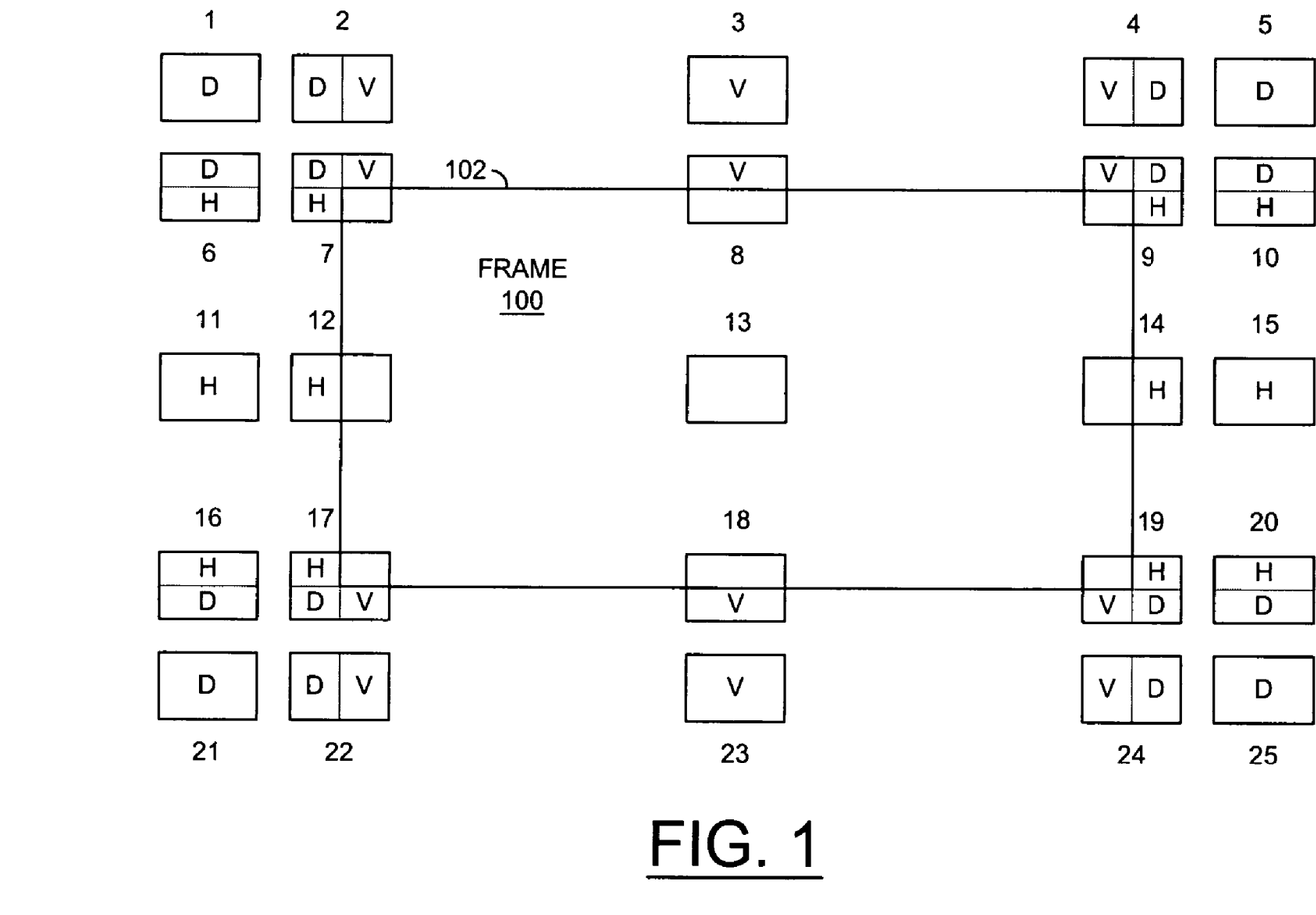
FIG. 1 is a diagram of a picture having a boundary.

Referring to FIG. 1, a diagram of a picture (or frame) 100 having a boundary 102 is shown. The picture 100 may be a reference picture used in estimating a motion vector for a current block of pixels. Modern digital video standards, such as the H.264 standard, generally allow motion estimation methods to search for motion vectors that point to samples (e.g., luminance components of pixels) outside of the boundary 102 where valid pixel data may not exist. Pad samples may be defined to effectively extend the picture 100 beyond the boundary 102 in support of the motion estimation methods.

When searching for motion vectors outside the boundary 102, the H.264 standard may specify twenty-four locations (e.g., rectangles 1-12 and 14-25) that are partially or fully outside of the boundary 102 and a location (e.g., rectangle 13) that is completely inside the boundary 102. Generating pad samples in the twenty-five locations 1-25 may be defined by the criteria provided in TABLE I as follows:

TABLE I

| Search Window Locations | Padding Criteria |
| --- | --- |
| 1, 5, 21, 25 | Diagonal (D) only. The corner sample inside the picture may pad the entire search window. |
| 2, 4, 22, 24 | Diagonal (D) and Vertical (V). The corner sample inside the picture may be used for D and the edge samples in the x-direction may be used for V. |
| 3, 8, 18, 23 | Vertical only. The edge sample in the x-direction may be used for V. |

TABLE I-continued

| Search Window Locations | Padding Criteria |
| --- | --- |
| 6, 10, 16, 20 | Diagonal (D) and Horizontal (H). The corner sample inside the picture may be used for D and the edge samples in the y-direction may be used for H. |
| 7, 9, 17, 19 | Diagonal (D), Vertical (V) and Horizontal (H). The corner sample inside the picture may be used for D, the edge samples in the x-direction may be used for V and the edge samples in the y-direction may be used for H. |
| 11, 12, 14, 15 | Horizontal (H) only. The edge samples in the y-direction may be used for H. |
| 13 | No padding. |

In the present invention, reference samples (from reference pixels) that physically exist may be stored in an external memory. The reference samples may be fetched from the external memory and stored to an internal reference (or search) memory within a motion estimation processor. When calculating coordinates for a macroblock to be fetched from the internal search memory, a determination may be made if any of the samples to be fetched fall outside the boundary 102 for picture 100. For samples that fall outside the boundary 102 (which may not exist in the internal search memory), reads to the internal search memory may be address mapped to the address of the actual reference samples (which do exist in internal search memory) to be used for padding. The mapping is generally based on the padding rules outlined above in FIG. 1 and TABLE I.

Figure 2:
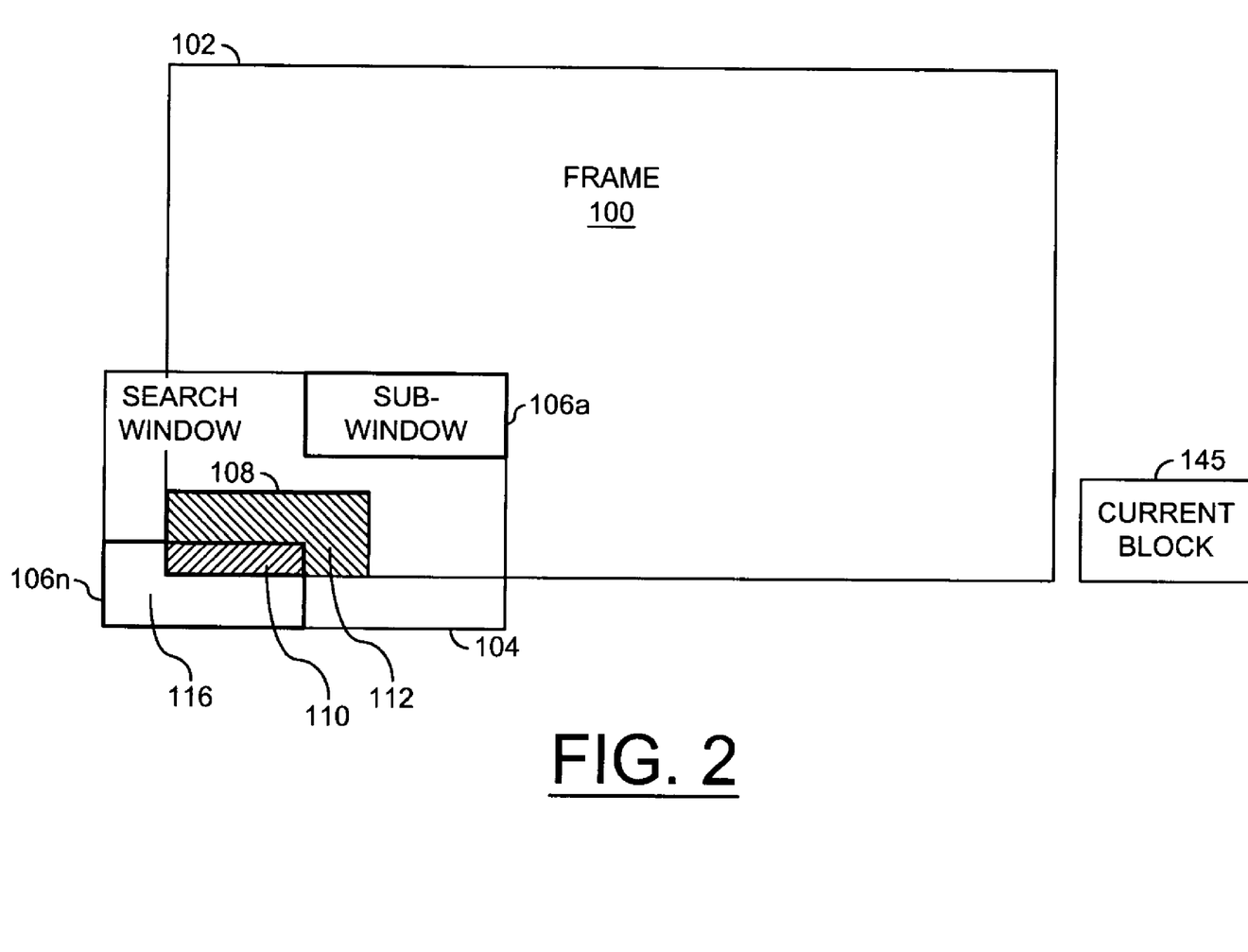
FIG. 2 is a diagram of a search window.

Referring to FIG. 2, a diagram of a search window 104 is shown. The search window 104 may reside inside the boundary 102 of the picture 100 for some searches and may overlap the boundary 102 for other searches. Multiple sub-windows 106a-106n may define groups of reference samples within the reference picture 100 that may be copied from the external memory to the internal search memory as part of the motion estimation method or process. In situations where the sub-window (e.g., 106a) is entirely within the boundary 102, the reference samples from within the sub-window 106a may be copied to the internal search memory. In situations where the sub-window (e.g., 106n) is partially overlapping or completely outside the boundary 102, the sample addresses from within a first region 116 (e.g., within the sub-window 106n and outside the boundary 102) may be mapped to a virtual window 108 back inside the boundary 102. The reference samples from the virtual window 108 may then be copied from the external memory to the internal search memory in support of the motion estimation process. By copying the reference samples from within the virtual window 108 into the internal search memory, the reference samples that are in both the target sub-window 106n and inside the boundary 102 (e.g., in a second region 110) may be copied into the internal search memory. Extra reference samples inside both the virtual window 108 and the boundary 102 but not within the sub-region 106n (e.g., in a third region 112) may optionally be copied to the internal search memory. The extra reference samples may be ignored during the motion estimation.

Figure 3:
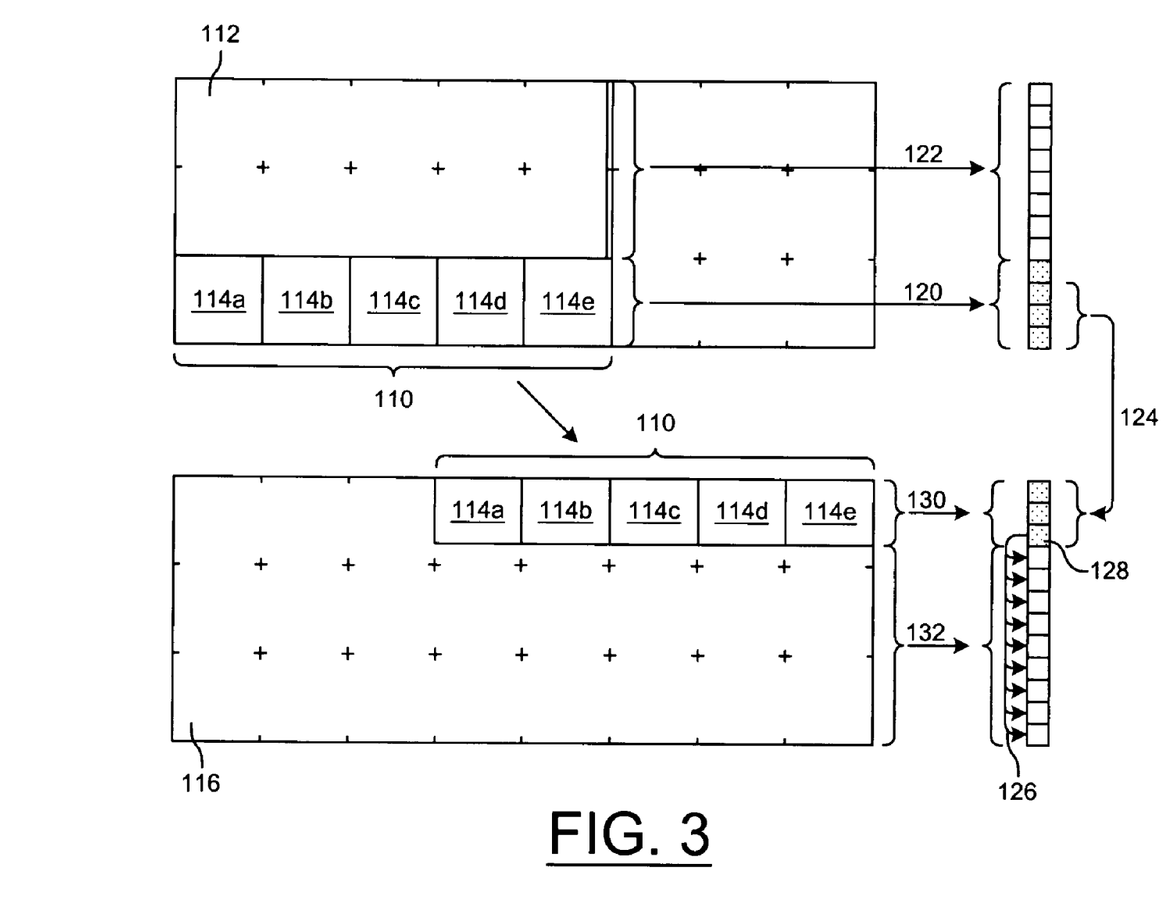
FIG. 3 is a diagram depicting a mapping of an internal search memory.

Referring to FIG. 3, a diagram depicting a mapping of the internal search memory is shown. The reference samples from the virtual window 108 may occupy locations in the internal search memory as stored in the external memory. In particular, the reference samples from the second region 110 and the third region 112 may be stored in the internal search memory as-is. By way of illustration, the second region 110 may include five blocks 114a-114e (e.g., each 16×16 samples) in a one by five horizontal row and the third region 112 may include nineteen blocks of extra reference samples filling the remainder of the internal search memory. Addresses generated for reading the internal search memory may be mapped to appear as though the internal search memory stores the reference samples (in the blocks 114a-114e) and pad samples (e.g., in the first region 116) from the sub-window 106n. Since the pad samples in the first region 116 may not actually exist, the address mapping may also map read accesses for the pad samples back to the appropriate reference samples in the second region 110.

The read mapping may be achieved by reading a column of samples from the internal search memory, one column at a time. The reference samples may then be shifted up or down in the column to an appropriate row and the appropriate pad samples may be simultaneously created from one or more of the actual reference samples within the internal search memory. For example, a read targeting the right-most column of samples from the block 114e may start by copying 120 the right-most column of reference samples from the block 114e and copying 122 the extra reference samples directly above in the third region 112. The samples in the column may be shifted 124 such that the reference samples from the block 114e are moved from a bottom to a top of the column. The extra reference samples in the column may be shifted out of the column. The lower rows of the column may be filled with pad samples by copying 126 a reference sample 128 in the column into the lower rows. As such, the resulting column may be aligned to appear as through the reference samples were read 130 and the pad samples were read 132 from the sub-window 106n region of the external memory.

The above approach may support situations where the search window 104 does not align along macroblock boundaries. For example, after reading sixteen reference samples from block 114e, the shifting 124 may leave less than sixteen samples from the block 114e in the column (e.g., twelve reference samples as illustrated). Likewise, the reading 120 of block 114e may begin in a column other than the right-most column. Therefore, the actual reference samples available for the search may represent non-integer or partial macroblocks.

The internal search memory may also be sized to simultaneously store the reference samples for more than one search. For example, the internal search memory may be sized to accommodate twenty-four macroblocks (e.g., an array of 8×3 macroblocks) total. However, a first portion of the internal search memory (e.g., a 5×3 macroblock capacity) may be available for a current search while a second portion (e.g., a 3×3 macroblock capacity) may be loaded for a next search. Other arrangements and sizes of the internal search memory may be implemented to meet the criteria of a particular application.

Figure 4:
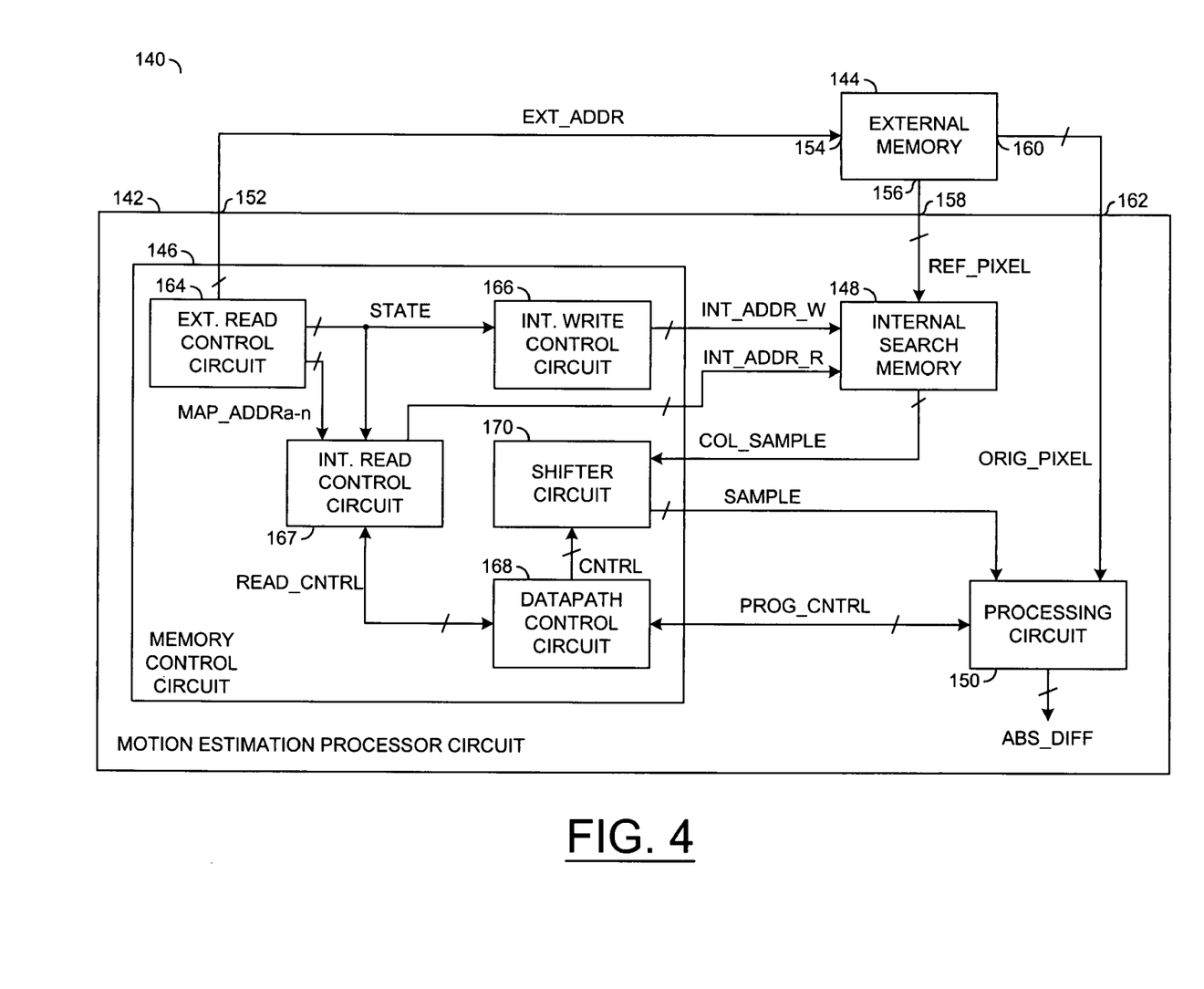
FIG. 4 is a block diagram of an example implementation of an apparatus in accordance with a preferred embodiment of the present invention.

Referring to FIG. 4, a block diagram of an example implementation of an apparatus 140 in accordance with a preferred embodiment of the present invention is shown. The apparatus 140 generally comprises a circuit (or module) 142 and a memory 144. The circuit 142 may be implemented as a motion estimation (ME) processor circuit. The memory 144 may be implemented as an external memory circuit fabricated independently of the ME processor circuit 142. An output 152 of the ME processor circuit 142 may present a signal (e.g., EXT_ADDR) to an input 154 of the external memory circuit 144. An output 156 of the external memory circuit 144 may present a signal (e.g., REF_PIXEL) to an input 158 of the ME processor circuit 142. An output 160 of the external memory circuit 144 may present a signal (e.g., ORIG_PIXEL) to an input 162 of the ME processor circuit 142.

The signal EXT_ADDR may be implemented as an address signal. The ME processor circuit 142 may generate the signal EXT_ADDR. The signal EXT_ADDR may be used as an address for write and read operations to and from the external memory circuit 144.

The signal REF_PIXEL may be implemented as a sequence of one or more reference samples. The signal REF_PIXEL may be read from the external memory circuit 144 based upon the signal EXT_ADDR. The reference samples transferred via the signal REF_PIXEL may define a reference picture used as a basis for the motion estimation of a current block of current samples.

The signal ORIG_PIXEL may be implemented as a sequence of one or more original or current samples. The signal ORIG_PIXEL may be read from the external memory circuit 144 based upon the signal EXT_ADDR. The current samples transferred via the signal ORIG_PIXEL may define the current block 145 for which a motion vector is being estimated.

The external memory circuit 144 may be operational to store the picture 100 of reference samples having the boundary 102. The external memory circuit 144 may also store one or more blocks 145 of current samples for which the motion vectors may be estimated by the ME processor circuit 142. In one embodiment, the external memory circuit 144 may be implemented as a two-port memory with the ME processor circuit 142 connected to one of the ports.

The ME processor circuit 142 generally comprises a circuit (or module 146), a memory 148 and a circuit (or module) 150. The circuit 146 may be implemented as a memory control circuit. The memory control circuit 146 may be operational to control movement of sample data from the external memory 144 to the memory 148, and from the memory 148 to the circuit 150. The circuit 146 may generate the signal EXT_ADDR. The circuit 146 may generate a signal (e.g., INT_ADDR_W) at an output coupled to an input of the memory 148. The circuit 146 may generate a signal (e.g., INT_ADDR_R) at an output coupled an another input of the memory 148. The circuit 146 may also generate a signal (e.g., SAMPLE) at an output coupled to an input of the circuit 150. An interface of the circuit 146 may be connected to an interface of the circuit 150 to exchange a signal (e.g., PROC_CNTRL). The circuit 150 may generate a signal (e.g., ABS_DIFF) at an output. The search memory circuit 148 may be operational to generate a signal (e.g., COL_SAMPLE) at an output coupled to an input of the circuit 146.

The signals INT_ADDR_W and INT_ADDR_R may be implemented as address signals. The signal INT_ADDR_W may control writes to the memory 148. The signal INT_ADDR_R may control reads from the memory 148. In one embodiment, the signal INT_ADDR_R may address an entire column of the memory 148 at a time. In another embodiment, the signals INT_ADDR_W and INT_ADDR_R may be combined as a single address signal.

The signal SAMPLE may be implemented as a sequence of one or more reference samples and/or pad samples. The reference samples and pad samples transferred via the signal SAMPLE may define a reference block against which the current block 145 is compared during the motion estimation process. In one embodiment, the signal SAMPLE may transfer forty-eight samples in parallel substantially simultaneously.

The signal PROC_CNTRL may be implemented as one or more control signals. The signal PROC_CNTRL may be transferred between the circuit 146 and the circuit 150 to govern a loading of the current samples from the signal ORIG_PIXEL and the reference samples from the signal SAMPLE into the circuit 150.

The signal ABS_DIFF may be implemented as multiple absolute difference values. Each absolute difference value may be a result of a comparison between a reference/pad sample and a corresponding current sample. In one embodiment, the signal ABS_DIFF may transfer 256 absolute difference values in parallel substantially simultaneously.

The signal COL_SAMPLE may be implemented as a sequence of columns of reference samples. The signal COL_SAMPLE may be responsive to the address signal INT_ADDR_R. In one embodiment, the signal COL_SAMPLE may transfer forty-eight reference samples in parallel substantially simultaneously.

The memory 148 may be implemented as an internal search (or reference) memory circuit. The internal search memory circuit 148 may be operational to store reference samples copied from the external memory circuit 144 for use in the motion estimation process. In one embodiment, the internal search memory circuit 148 may be sized to store up to twenty-four blocks of samples arranged as eight blocks horizontal by three blocks vertical. Each block may be arranged as a 16×16 array of samples. Each sample may be represented by a byte of data.

The circuit 150 may be implemented as a processing circuit. The processing circuit 150 may be operational to compare each reference and pad sample conveyed by the signal SAMPLE to a corresponding current sample conveyed by the signal ORIG_PIXEL. The processing circuit 150 may generate the multiple values of the signal ABS_DIFF based upon each comparison. Additional details for the processor circuit 150 may be found in the co-pending U.S. non-provisional application "Multi-Standard Variable Block Size Motion Estimation Processor", Ser. No. 10/669,930, filed Sep. 24, 2003, hereby incorporated by reference in its entirety.

The memory control circuit 146 generally comprises a circuit (or module) 164, a circuit (or module) 166, a circuit (or module) 167, a circuit (or module) 168 and a circuit (or module) 170. The circuit 164 may be operational to generate the signal EXT_ADDR. The circuit 164 may also generate a signal (e.g., MAP_ADDR) at an output coupled to an input of the circuit 167. The circuit 164 may generate a signal (e.g., STATE) at an output coupled to an input of the circuit 166 and an input of the circuit 167. The circuit 166 may be operational to generate the signal INT_ADDR_W. The circuit 167 may be operational to generate the signal INT_ADDR_R. The circuit 168 may be operational to generate a signal (e.g., CNTRL) at an output coupled to an input of the circuit 170. The circuit 168 may be further operational to generate a signal (e.g., READ_CNTRL) at an output coupled to an input of the circuit 167. The circuit 168 may also be operational to generate the signal PROC_CNTRL. The circuit 170 may be operational to generate the signal SAMPLE based upon the signal COL_SAMPLE and the signal CNTRL.

The signal CNTRL may be implemented as multiple control signals. The signal CNTRL may be used to control generation of the pad samples from the reference samples. The signal CNTRL may also be used to control shifting of the reference samples into the appropriate rows for the column of samples provided to the processing circuit 150. The signal CNTRL may be used to enable/disable generation of the pad samples.

The signal MAP_ADDR may be implemented as multiple address signals. The signals MAP_ADDR may indicate if each address for a macroblock (MB) column (e.g., a column three macroblocks vertical and a macroblock horizontal) written to the internal search memory circuit 148 has been mapped or not. If a macroblock column has been mapped, the respective portion of the signal MAP_ADDR may be asserted with a value indicating a distance of the mapping offset, else deasserted (e.g., a zero offset value).

The signal STATE may carry a state value indicating a horizontal position of a macroblock column read from the external memory circuit 144 relative to the picture 100. The state value may indicate that the macroblock column is fully to the left of the boundary 102, crossing a left edge of the boundary 102, between the left edge and a right edge of the boundary 102, crossing the right edge, or fully to the right of the boundary 102. Other implementations of the state value may be implemented to meet the criteria of a particular application.

The signal READ_CNTRL may be implemented as one or more control signals. The signal READ_CNTRL may command the circuit 167 to generate the read signal INT_ADDR_R to transfer a column of samples from the internal search memory 148 to the circuit 170.

The circuit 164 may be referred to as an external read control circuit. The circuit 166 may be referred to as an internal write control circuit. The internal write control circuit 166 may be operational to write macroblock columns presented by the external memory circuit 144 to the internal search memory circuit 148. The circuit 167 may be referred to as a internal read control circuit. The internal read control circuit 167 may be operational to sequence reads from the internal search memory 148 to generate the signal COL_SAMPLE. The circuit 168 may be referred to as a datapath control circuit. The datapath control circuit 168 may be operational to control flow of the samples through the ME processor circuit 142 The circuit 170 may be referred to as a shifter circuit.

Figure 5:
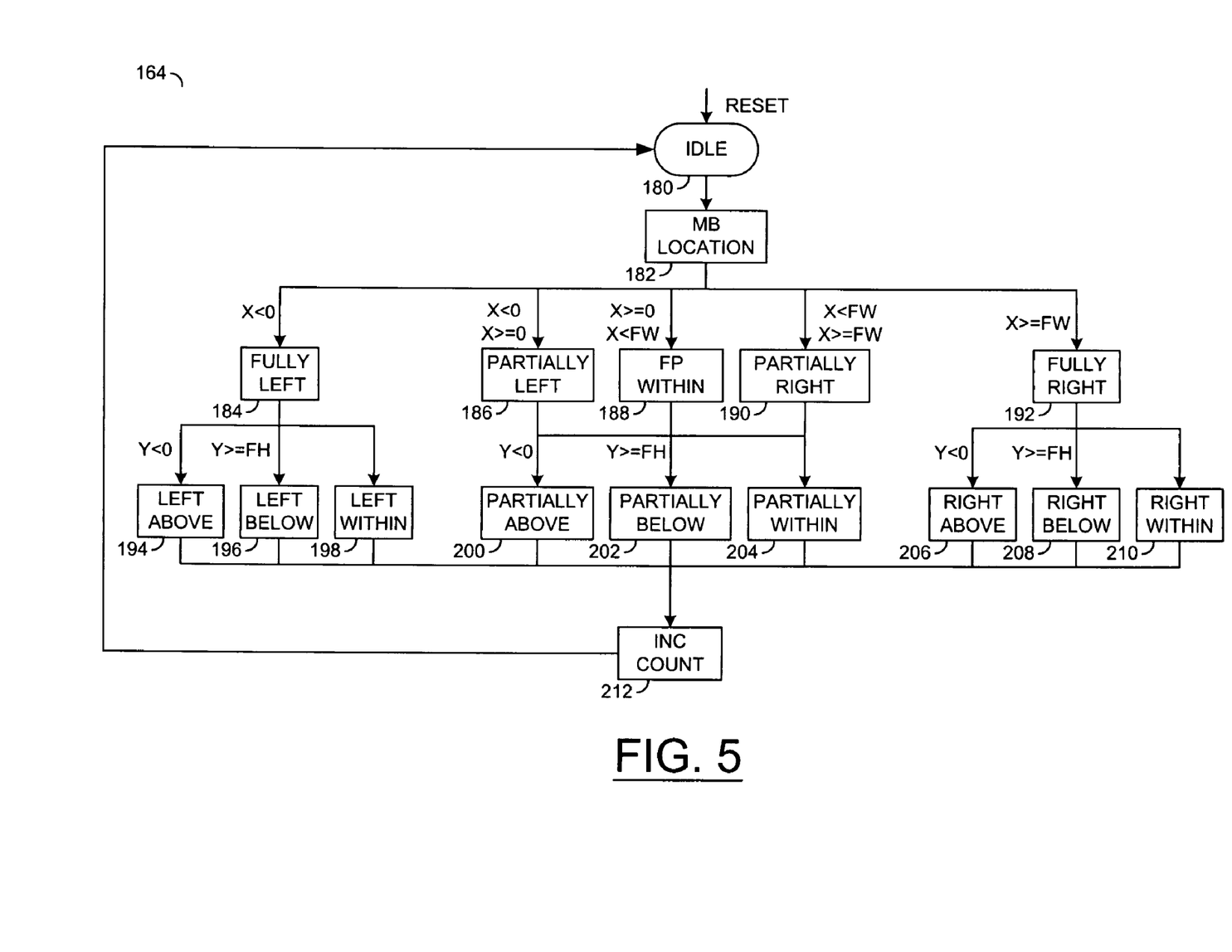
FIG. 5 is a diagram of an example state machine implemented by a external read control circuit.

Referring to FIG. 5 a diagram of an example state machine implemented by the external read control circuit 164 is shown. The state machine generally comprises an IDLE state 180, an MB COLUMN LOCATION state 182, a FULLY LEFT state 184, a PARTIALLY LEFT state 186, an FULLY/PARTIALLY (FP) WITHIN state 188, a PARTIALLY RIGHT state 190, a FULLY RIGHT state 192, a LEFT ABOVE state 194, a LEFT BELOW state 196, a LEFT WITHIN state 198, a PARTIALLY ABOVE state 200, a PARTIALLY BELOW state 202, a PARTIALLY WITHIN state 204, a RIGHT ABOVE state 206, a RIGHT BELOW state 208 a RIGHT WITHIN state 210 and an INCREMENT COUNTER state 212.

The external read control circuit 164 generally determines an X and a Y position of the macroblock column samples to be fetched out of external memory circuit 144 (e.g., state 182). During the X coordinate calculations, the location of the macroblock columns with respect to the left edge (e.g., X=0) and the right edge (e.g., X=Frame Width (FW)) of the boundary 102 may be also determined (e.g., states 184-192) relative to the frame width of the picture 100. During Y coordinate calculations, the location of the macroblock columns with respect to a top edge (e.g., Y=0) and a bottom edge (e.g., Y=Frame Height (FH)) may also be determined (e.g., states 194-210) relative to the frame height of the picture 100. If a macroblock column is partially or completely outside the boundary 102, byte padding may be performed by the shifter circuit 170 to generate pad samples. The IDLE state 180 may idle the external read control circuit 164 while waiting for a new macroblock column address to consider. The INCREMENT COUNTER state 212 may count a predetermined number of macroblock columns (e.g., 5) to copy from the external memory circuit 144 to the internal search memory circuit 148.

The state machine may first determine that a particular macroblock column is within one of five states (e.g., 184-192) in a vertical direction relative to the picture 100. The state machine may then determine that the particular macroblock column is within one of nine states (e.g., states 194-210) in a horizontal direction relative to the picture 100. Based upon the determined state in the horizontal direction, the signal EXT_ADDR may or may not be mapped to prohibit any attempt to read non-existing samples from the external memory circuit 144. The mapping/non-mapping of the signal EXT_ADDR may be defined in TABLE II as follows:

TABLE II

| State | MB Column Location (See FIG. 1) | X_Coordinate | Y_Coordinate |
|---|---|---|---|
| LEFT ABOVE | 1 | 0 | 0 |
| LEFT BELOW | 21 | 0 | FH-48 (e.g., 3x16) |
| LEFT WITHIN | 6, 11, 16 | 0 | Y_Coordinate |
| PARTIALLY ABOVE | 2, 3, 4 | X_Coordinate | 0 |
| PARTIALLY BELOW | 22, 23, 24 | X_Coordinate | FH-48 |
| PARTIALLY WITHIN | 7, 12, 17, 8, 13, 18, 9, 14, 19 | X_Coordinate | Y_Coordinate |
| RIGHT ABOVE | 5 | FW-16 | 0 |
| RIGHT BELOW | 25 | FW-16 | FW-48 |
| RIGHT WITHIN | 10, 15, 20 | FW-16 | Y_Coordinate |

The address for a macroblock column is generally identified as the top left sample in the top macroblock. The address for a macroblock column extending partially or fully below the bottom edge of the boundary 102 may have the Y_Coordinate mapped to the frame height offset by 48pixels such that the macroblock column actually read from the external memory circuit 144 is within the picture 100 (e.g., within the virtual window 108 in FIG. 2). The address for a macroblock column extending partially or fully right of the right edge of the boundary 102 may have the X_Coordinate mapped to the frame width offset by 16 pixels such that the macroblock column actually read from the external memory circuit 144 is within the picture 100. For each macroblock column mapped, the external read control circuit 164 may assert a corresponding part of the signal MAP_ADDR (e.g., MAP_ADDRa-MAP_ADDRn).

Figure 6:
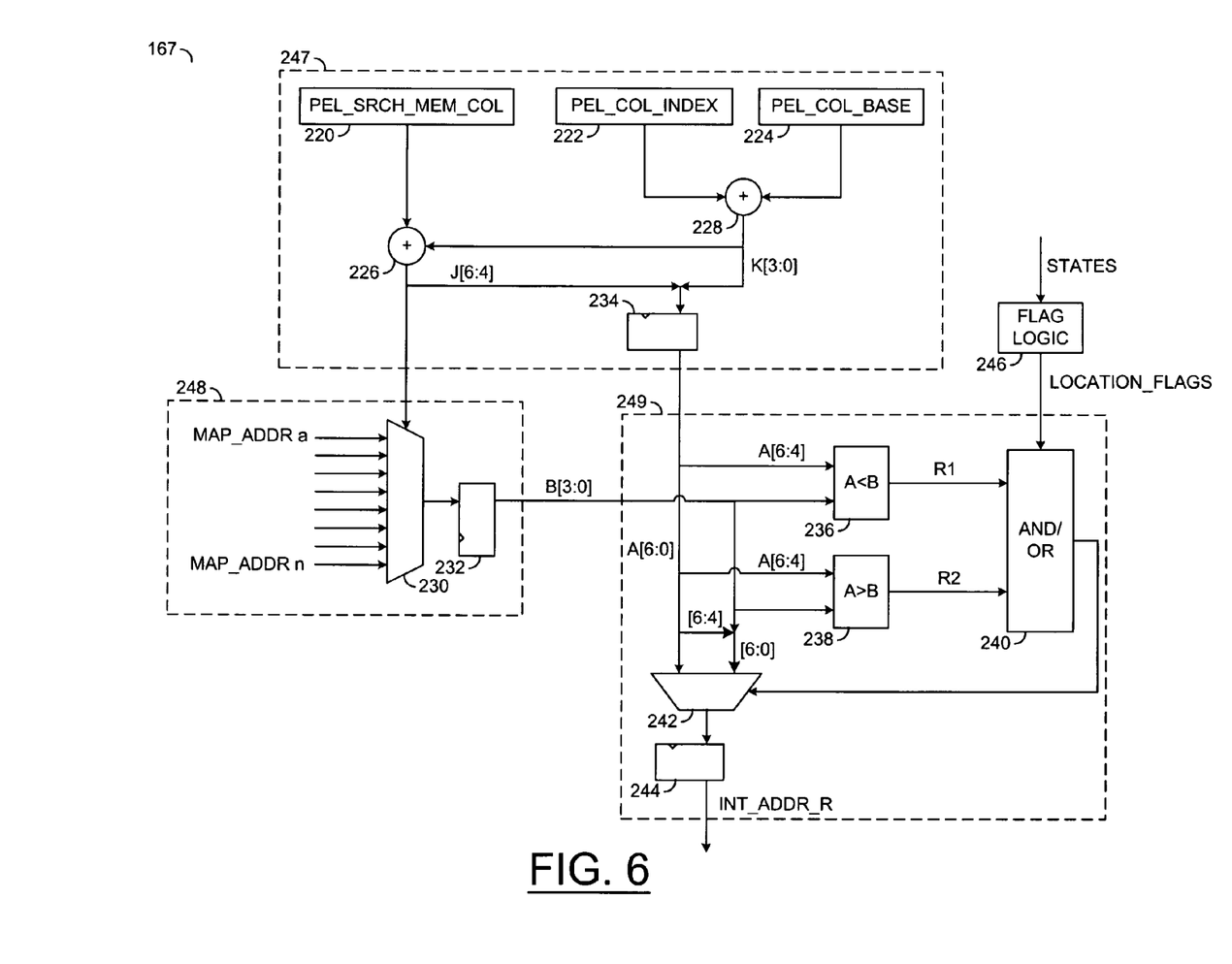
FIG. 6 is a block diagram of an example implementation of an internal read control circuit.

Referring to FIG. 6, a block diagram of an example implementation of the internal read control circuit 167 is shown. The internal read control circuit 167 generally comprises a register 220, a register 222, a register 224, an adder 226, an adder 228, a multiplexer 230, a register 232, a register 234, a comparison circuit 236, a comparison circuit 238, a logic circuit 240, a multiplexer 242, a register 244 and a flag logic circuit 246. The register 220 may store a value (e.g., PEL_SRCH_MEM_COL). The register 222 may store a value (e.g., PEL_COL_INDEX). The register 224 may store a value (e.g., PEL_COL_BASE). The multiplexer 230 may receive the signals MAP_ADDRa-MAP_ADDRn. The register 244 may present the signal INT_ADDR_R. The flag logic circuit 246 may receive the signal STATE.

The registers 220, 222, 224 and 234 and the adders 226 and 228 may collectively form a circuit 247. The circuit 247 may be operational to generate an intermediate address (e.g., A). The multiplexer 230 and the register 232 may form a circuit 248. The circuit 248 may be operational to generate an intermediate map address (e.g., B). The comparison circuits 236 and 238, the logic circuit 240, the multiplexer 242 and the register 244 may form a circuit 249. The circuit 249 may generate the signal INT_ADDR_R.

The value PEL_COL_INDEX may identify a particular macroblock column from a sub-window 162a-162n being utilized. The value PEL_COL_BASE may identify a base address for the macroblock column relative to the picture 100. The value PEL_SRCH_MEM_COL may identify a particular single-sample wide column of samples to be read from the internal search memory circuit 148.

The adders 226 and 228 may add the values PEL_SRCH_MEM_COL, PEL_COL_INDEX and PEL_COL_BASE to generate an address (e.g., J). The upper bit (e.g., 3 bits) of the address J may be used to control the multiplexer 230 to generate the intermediate map address B by routing one of the signals MAP_ADDRa-MAP_ADDRn. The adder 228 may add the value PEL_COL_INDEX and PEL_COL_BASE to generate an address (e.g., K). The register 234 may append the upper bits of the address J with the address K to generate the intermediate address A.

The flag logic circuit 246 may generate values (e.g., LOCATION_FLAGS) provided to the logic circuit 240. The comparison circuits 236 and 238 may compare the addresses A and B to generate results (e.g., R1 and R2), respectively. Based upon the values R1, R2 and LOCATION_FLAGS, the logic circuit 240 may determine if the intermediate address A or the intermediate map address B may be used for the address signal INT_ADDR_R.

The flag logic circuit 246 may transform the signal STATE into the value LOCATION_FLAGS. The transformation may be based on the five horizontal states (e.g., 184-192, see FIG. 5) determined by the external read control circuit 164. The generation of the value LOCATION_FLAGS may be described in TABLE III as follows:

TABLE III

| MB Column Location | INT_ADDR_R | LOCATION_FLAGS |
| --- | --- | --- |
| 1, 6, 11, 16, 21 | 0 | 11 = Fully Left of frame (184) |
| 2, 7, 12, 17, 22 | Abs(0-X_Coordinate) | 10 = Partially Left of frame (186) |
| 3, 8, 13, 18, 23 | No mapping | 00 = Fully or Partially within frame (188) |
| 4, 9, 14, 19, 24 | (X_Coordinate-FW-1) | 01 = Partially Right of frame (190) |
| 5, 10, 15, 20, 25 | 15 | 11 = Fully Right of frame (192) |

Depending on a location of a particular macroblock column with respect to the boundary 102, an appropriate macroblock column may be fetched out of internal search memory circuit 148. From the mapping/non-mapping performed per TABLE III, the reference data stored in the internal search memory circuit 148 may be either good reference data (no padding used) or the mapped macroblock column data (padding may be generated). For mapped macroblock columns, further mapping is generally performed to generate the pad samples from the reference samples stored in the internal search memory circuit 148. The mapping may determine which column in the internal search memory circuit 148 the data for the pad samples may be read. For a mapped address signal INT_ADDR_R, a vertical padded byte is identified and used in the shifter circuit 170 to generate one or more pad samples. The data presented by the shifter circuit 170 may be reference samples, pad samples or a combination of one or more pad samples appended to a group of one or more reference samples.

Figure 7:
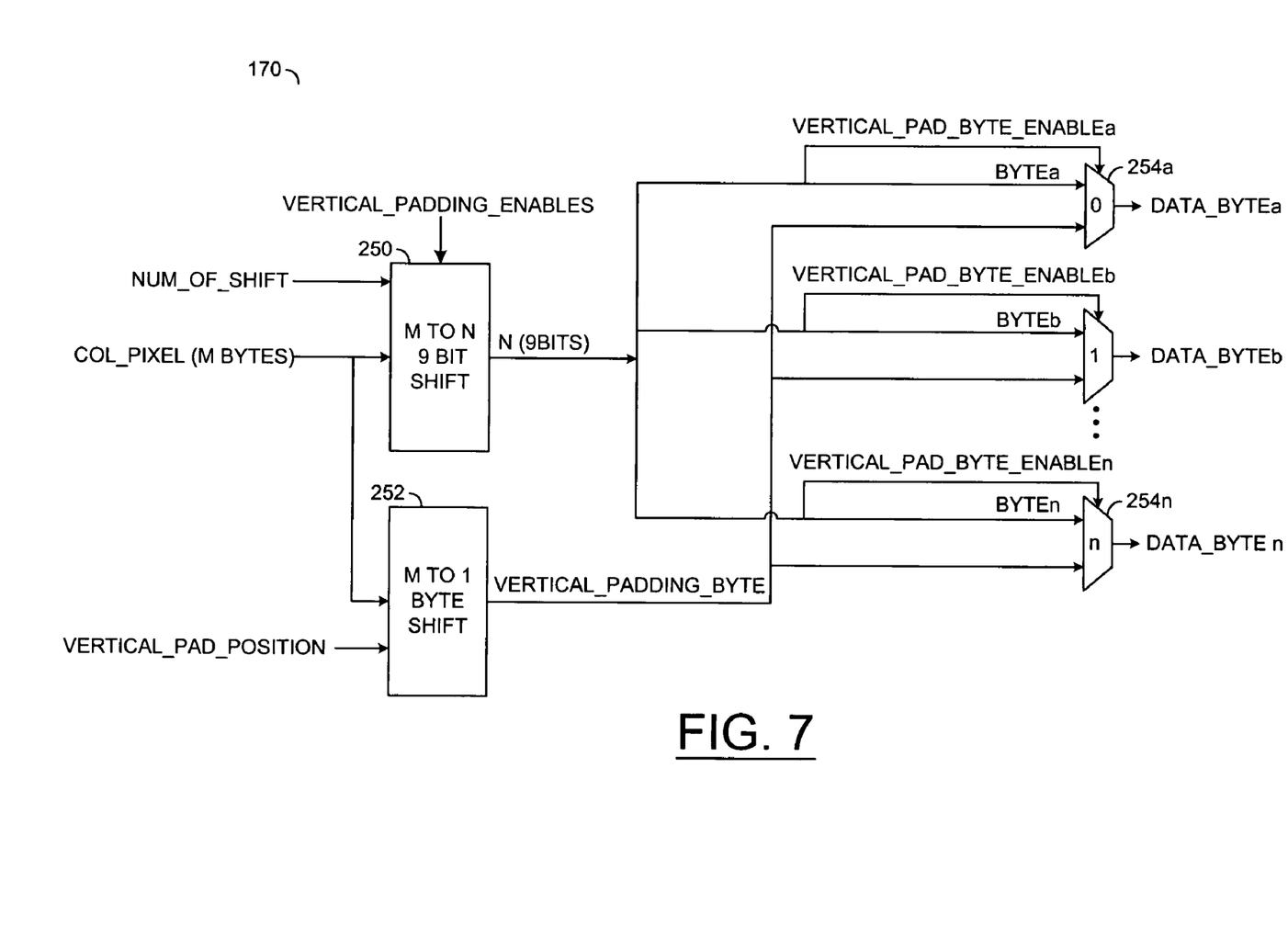
FIG. 7 is a block diagram of an example implementation of a shifter circuit.

Referring to FIG. 7, a block diagram of an example implementation of the shifter circuit 170 is shown. The shifter circuit 170 generally comprises a shift circuit 250, a shift circuit 252 and multiple multiplexers 254a-254n. The shift circuits 250 and 252 may both receive a column of samples from the internal search memory circuit 148 in the signal COL_SAMPLE. The signal COL_SAMPLE may include M samples. In one embodiment, M may be forty-eight samples read from a single column of a macroblock column. Each sample may have a byte of information.

The shift circuit 250 may be implemented as an M-to-N 9-bit shifter. The shift circuit 250 may shift the M samples to align with N outputs based on a signal (e.g., NUM_OF_SHIFT). The signal NUM_OF_SHIFT may form a portion of the signal CNTRL. The signal NUM_OF_SHIFT may indicate how many rows the samples are to be shifted to map or align the samples from the respective locations in the internal search memory circuit 148 to the corresponding locations relative to the picture 100 (e.g., reverse the vertical mapping when copied from the external memory circuit 144 to the internal search memory circuit 148).

An enable bit (e.g., VERTICAL_PAD_BYTE_ENABLEa-VERTICAL_PAD_BYTE_ENABLEn) may be appended to each of the 8-bit sample data after shifting to indicate if the shifted sample data may be actual reference samples or not. The enable bits may be received by the shift circuit 250 via a signal (e.g., VERTICAL_PADDING_ENABLES). The signal VERTICAL_PADDING_ENABLES may form a portion of the signal CNTRL. Each of the resulting 9-bit signals may be presented to a first input of a corresponding multiplexers 254a-254n. Each enable bit VERTICAL_PAD_BYTE_ENABLEa thru VERTICAL_PAD_BYTE_ENABLEn may control a respective multiplexer 254a-254n.

The shift circuit 252 may be implemented as an M-to-1 shifter. The shift circuit 252 may shift a particular one of the M samples from the signal COL_SAMPLE to operate as a pad sample (e.g., VERTICAL_PADDING_BYTE). The shifter circuit 252 may determine the particular sample based on a signal (e.g., VERTICAL_PAD_POSITION). The signal VERTICAL_PAD_POSITION may form a portion of the signal CNTRL.

The pad sample may be presented to a second input of each multiplexer 254a-254n. The multiplexers 254a-254n generally route either the samples received from the shift circuit 250 or the pad sample received from the shift circuit 252 to form the signal SAMPLE. In one embodiment, sixteen multiplexers 254a-254n may be implemented to generate a 16×16 block used as a reference block aligned with a 16×16 current block for comparison during the motion estimation process.

An H.264 encoder with a motion estimation processor may make use of the present invention. Furthermore, encoders with motion estimation processors for any other digital video compression standard that allows motion over picture boundaries (e.g. MPEG-4 Part 2, H.263, H.263+ and the like) may make use of the present invention. The use of address mapping to read the pad samples from the reference samples in the internal search memory generally permits a size of the external memory (e.g., DRAM) to be smaller compared with convention designs that store a frame of pad samples around the picture in the external memory. The address mapping may also reduce memory bandwidth for the external memory as the frame pad samples are not written to or read from the external memory. A size of the internal search memory may also be reduced as compared with conventional designs that store pad samples from the picture frame due to the absence of dedicated pad samples.

The present invention may also be implemented by the preparation of ASICs, FPGAs, or by interconnecting an appropriate network of conventional component circuits (such as conventional circuit implementing a state machine), as is described herein, modifications of which will be readily apparent to those skilled in the art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a first memory configured to store a plurality of reference samples in a search window to support a motion estimation of a current block beyond a boundary of a picture;
   a write control circuit configured to control a copying of said reference samples in said search window from said first memory to a shifter circuit, one column of a plurality of columns of said reference samples at a time;
   a datapath control circuit configured to generate a plurality of signals that control mapping of a plurality of pad samples from said reference samples;
   said shifter circuit configured to (i) shift said references samples in each of said columns to align said reference samples relative to an edge of a sub-window when said sub-window is at least partially outside of said boundary and (ii) generate said plurality of pad samples in said columns by duplicating some of said reference samples copied from said first memory to spatially append said pad samples to at least one of said reference samples in response to said signals, wherein said shifter circuit comprises (i) a first shifter configured to shift said reference samples, (ii) a second shifter configured to generate a particular pad sample of said pad samples by shifting one of said reference samples and (iii) a plurality of multiplexers each configured to multiplex said particular pad sample and a corresponding one of said reference samples; and
   a processing circuit configured to generate a plurality of difference values by comparing said current block against (i) said reference samples in said sub-window and (ii) said pad samples in said sub-window.

2. The apparatus according to claim 1, further comprising an external read control circuit configured to determine if said search window is at least partially outside of said boundary.

3. The apparatus according to claim 2, wherein said external read control circuit comprises a state machine configured to generate (i) a plurality of map addresses and (ii) a state signal all in response to a position of said sub-window relative to said boundary.

4. The apparatus according to claim 3, further comprising an internal read control circuit configured to generate a read address to said first memory in response to both said map addresses and said state signal.

5. The apparatus according to claim 3, further comprising:
   a first circuit configured to generate an intermediate address; and
   a second circuit configured to generate a read address to said first memory by comparing said intermediate address with one of said map addresses.

6. The apparatus according to claim 5, further comprising a third circuit configured to generate a plurality of flags based on said state signal.

7. The apparatus according to claim 6, wherein said second circuit is further responsive to said flags that indicate one of (i) outside a left edge of said boundary, (ii) crossing said left edge, (iii) between said left edge and a right edge of said boundary, (iv) crossing said right edge and (v) outside said right edge.

8. A method for supporting a motion estimation of a current block beyond a boundary of a picture, comprising the steps of:
   (A) copying a plurality of reference samples in a search window from a first memory to a shifter circuit, one column of a plurality of columns of said reference samples at a time;
   (B) generating a plurality of signals that control mapping of a plurality of pad samples from said reference samples;
   (C) shifting said references samples in each of said columns within said shifter circuit to align said reference samples relative to an edge of a sub-window when said sub-window is at least partially outside of said boundary, wherein said shifter circuit comprises (i) a first shifter configured to shift said reference samples, (ii) a second shifter configured to generate a particular pad sample of said pad samples by shifting one of said reference samples and (iii) a plurality of multiplexers each configured to multiplex said particular pad sample and a corresponding one of said reference samples;
   (D) generating said plurality of pad samples in said columns within said shifter circuit by duplicating some of said reference samples copied from said first memory to spatially append said pad samples to at least one of said reference samples in response to said signals; and
   (E) generating a plurality of difference values within a processing circuit by comparing said current block against (i) said reference samples in said sub-window and (ii) said pad samples in said sub-window.

9. The method according to claim 8, wherein said current block comprise a 16 by 16 block.

10. The method according to claim 8, further comprising the step of:
    copying a number of blocks of said reference samples from a second memory to said first memory prior to copying said reference samples to said shifter circuit.

11. The method according to claim 10, wherein said sub-window comprises a 3-vertical by 5-horizontal arrangement of said blocks.

12. An apparatus comprising:
    means for storing a plurality of reference samples in a search window to support a motion estimation of a current block beyond a boundary of a picture;
    means for controlling a copying of said reference samples in said search window from said means for storing to a means for shifting, one column of a plurality of columns of said reference samples at a time;
    means for generating a plurality of signals that control mapping of a plurality of pad samples from said reference samples;
    means for (i) shifting said references samples in each of said columns to align said reference samples relative to an edge of a sub-window when said sub-window is at least partially outside of said boundary and (ii) generating said plurality of pad samples in said columns by duplicating some of said reference samples copied from said means for storing to spatially append said pad samples to at least one of said reference samples in response to said signals, wherein said means for shifting comprises (i) a first shifter configured to shift said reference samples, (ii) a second shifter configured to generate a particular pad sample of said pad samples by shifting one of said reference samples and (iii) a plurality of multiplexers each configured to multiplex said particular pad sample and a corresponding one of said reference samples; and means for generating a plurality of difference values by comparing said current block against only (i) said reference samples in said sub-window and (ii) said pad samples in said sub-window.

13. The method according to claim 8, further comprising the step of:

generating a particular pad sample of said pad samples by shifting one of said reference samples within said shifter circuit.

14. The method according to claim 13, further comprising the step of:

multiplexing said particular pad sample and a corresponding one of said reference samples to populate each position in one of said columns.

15. The method according to claim 8, further comprising the steps of:

generating a plurality of map addresses in response to a position of said sub-window relative to said boundary; and generating a state signal in response to said position of said sub-window relative to said boundary.

16. The method according to claim 15, further comprising the step of:

generating a read address to said first memory in response to both said map addresses and said state signal.

* * * * *